Figure 1:
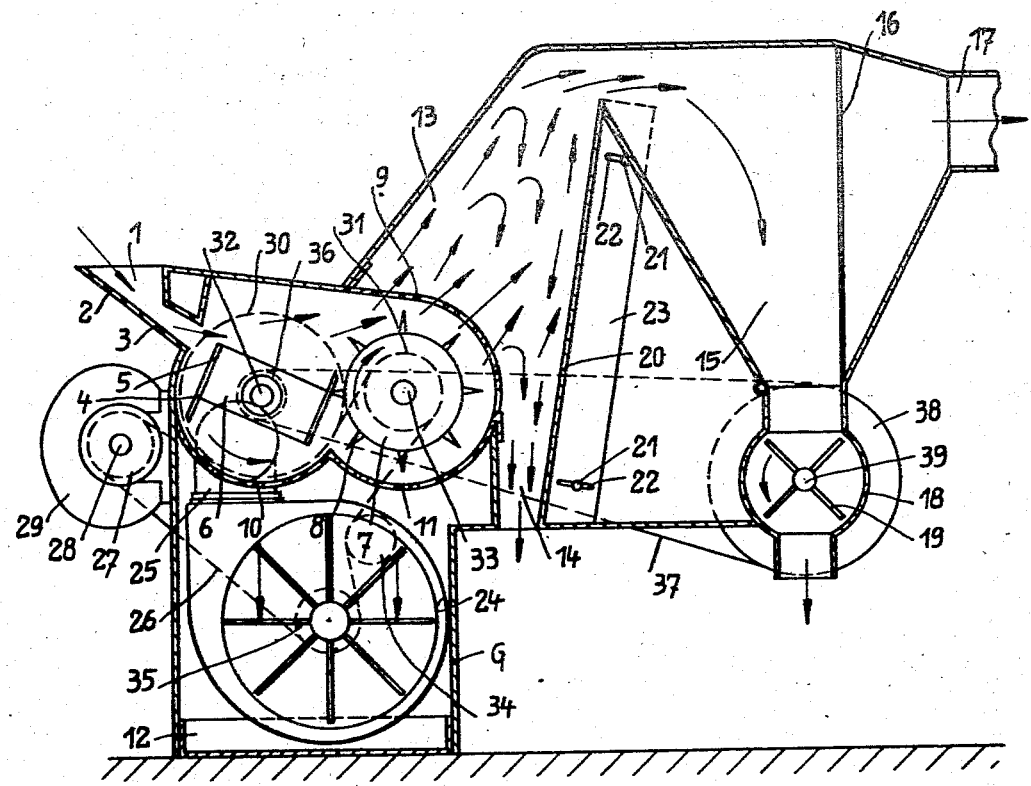

June 27, 1939.   O. E. EISSMANN   2,163,833
APPARATUS FOR COMMINUTING AND CLASSIFYING TOBACCO
Filed Oct. 9, 1935

Inventor:
O. E. Eissmann
By C. F. Wendroth
Atty

Patented June 27, 1939

2,163,833

UNITED STATES PATENT OFFICE 2,163,833

APPARATUS FOR COMMINUTING AND CLASSIFYING TOBACCO

Oswald Erich Eissmann, Dresden, Germany, assignor to "Universelle" Cigarettenmaschinen-Fabrik J. C. Muller & Co., Dresden, Germany Application October 9, 1935, Serial No. 44,287
In Germany October 13, 1934

4 Claims. (Cl. 131—60)

The present invention relates to an apparatus for cutting up tobacco leaves and then classifying the portions of the tobacco leaves after they have been cut.

Devices for comminuting and cutting up tobacco leaves are well known and also devices for classifying the leaf portions are also well known. Heretofore these prior arrangements have been separately constructed units with special conveyor means leading from the cutting apparatus to the classifying apparatus.

In accordance with the present invention the comminuting and cutting apparatus is directly combined with a classifying apparatus which is of the pneumatic type in a housing in which a screen is used which subdivides the point of connection between the two devices. By means of the present invention therefore an intermediate conveyor between the comminuting device and the separating apparatus is rendered unnecessary.

It is an object of the invention to provide an arrangement wherein the raw tobacco leaves are advanced in a hopper or passageway into the comminuting apparatus and at the discharge opening of the passageway comb prong bars are mounted on a rotary support which come into action for comminuting the advancing leaf portions of the tobacco and cooperating therewith a rotating beater cross, pin roller, or the like is provided. The pins of the pin roller engage the leaf strips hanging upon the comb prongs and deliver them through a screen grating into the separating and classifying mechanism.

The classifying apparatus in accordance with the invention, may be of any type. The preferred type illustrated in the present application consists of a construction wherein the comminuted leaf portions pass into a passage which is subdivided by partitions and through which the air used for conveying the leaf portions passes. The classifying apparatus is also provided with outlets for the various classified leaf portions.

In accordance with the present invention the raw tobacco leaves are not supplied to the comminuting device by means of conveyor rollers, conveyor bands or the like, but is supplied thereto by means of an inclined chute which forms the bottom of a delivery passage and by this means the length of the apparatus is shortened.

Figure 2:
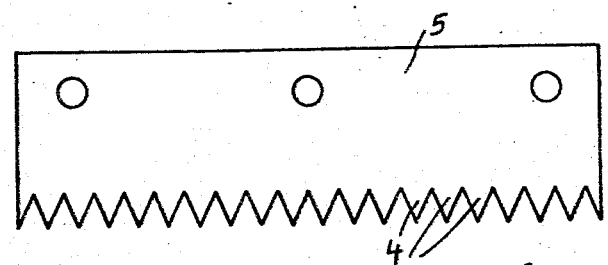

With the above and other objects in view which will become apparent as the description proceeds, the invention consists in the combination and arrangement of parts set forth below and shown in the drawing, in which:

Figure 1 illustrates diagrammatically a cross sectional view in vertical longitudinal section through an embodiment of the invention and Figure 2 is a detail view of a comb prong bar used in the comminuting apparatus.

Referring to the drawing the raw tobacco leaves are introduced into the hopper 1 which has a bottom 2 formed as an inclined chute so that the leaves placed in the hopper will pass through the passage 3. The leaves passing through the passage 3 are engaged by the tines or prongs 4 and are stripped or stemmed. The tines are mounted on the bars 5 shown particularly in Figure 2 and the bars 5 are attached to a support 6 which rotates in the direction of the arrow. Cooperating with the comb prong device is a pin roller 7 which rotates in the direction of the arrow more rapidly than the support 6 with the prongs 4 and the pins 8 of the pin roller 7 engage in the interstices of the comb tines in order to remove the hanging leaf portions and carry them along. The leaf portions are thrown off the pin roller and pass through the interstices of a screen grating 9.

Located below the rotating support 6 and the pin roller 7 are the screens 10 and 11 which are curved concentrically with relation to the rotating members 6 and 7 and over which the leaf portions are carried. Thereby the sand and other adhering contaminations or heavy particles are detached at this point and drop down through the screen openings into the collecting receptacle 12.

The leaf portions upon the other hand, are carried by an upwardly directed air current through the interstices of the screen 9 above mentioned, into the passage 13. The air current is of such strength and is so calculated that the heavier leaf portions such as the stems, will drop downwardly and be carried off through the outlet 14 located at the lower portion of the passage 13. The lighter leaf portions on the other hand, will be carried by the air stream into the separator 15 which is sub-divided by the screen 16. The dust laden air will pass through the screen 16 to the discharge pipe 17 and the leaf portions will sink downwardly and pass into the sluice 18 which is provided with the rotary cross member 19. The stem portions and the lighter leaf portions are thereby separated at two fairly closely adjacent points and may be collected in various containers or the like held in readiness therefor.

The screen 9 is constructed so as to be interchangeable so that different screens may be mounted in the positions shown for different kinds of tobacco. The various interchangeable screens will be provided with larger or smaller openings in conformity with the type of tobacco being operated upon.

The rear wall 20 of the passage 13 is constructed adjustably by having the attaching screws 21 pass through slots 22 located in the jaws 23 upon the lateral walls of the device. By means of this adjustment the cross section of the passage 13 may be varied so as to correspond to the prevailing operative conditions.

In the embodiment illustrated it is assumed that a suction fan is connected with the pipe 17. Compressed air might, if desired, be used for conveying the tobacco portions.

Located adjacent the base frame G is the fan 24 having the intake pipe 25 whereby the fan empties into the housing of the communicating apparatus. The fan is driven by a belt pulley 26 which passes over the drive pulley 27. The latter is attached on the shaft 28 of the electric motor 29 mounted on the machine frame G. The drive belt 26 is also passed over the drive pulleys 30 and 31 which are attached on the shaft 32 of the rotary support 6 and shaft 33 of the pin roller 7. A tension roller 34 cooperates with the belt 26 so as to maintain proper positioning of the belt on the puley 35 mounted on the fan shaft.

A second belt pulley 36 is positioned on the shaft 32 and is connected with the pulley 38 on the shaft 39 of the sluice flywheel 19 by the belt 37.

Any comminuting apparatus for the raw tobacco leaves may be used and for the purposes of the invention it is merely essential that such comminuting apparatus should be located in a housing which has a lower discharge opening for the heavy comminuted portions of the leaf such as the stems, and that the wall of such housing should be provided with passages and outlets for the lighter leaf portions. Also in accordance with the invention the pneumatic sorting apparatus should be connected directly with the above mentioned outlets and passages whereby the light leaf portions may be carried therealong by the air current.

An essential feature of the invention is forming one wall of the housing as a screen and the classifying and sorting device is connected directly with this wall. In the sorting apparatus the leaf portions may be sorted in any desired manner whereby heavier portions will pass through one passageway and lighter portions through another.

With regard to the comminuting apparatus disclosed above, the tobacco leaves pass in layers through the passageway 3 into the comminuting apparatus. The comb prongs 4 rotate at the end of this passage. These prongs are as illustrated, located on a plate 5 which is as wide as the passage opening and two of such plates 5 are attached to the supporting member 6 which is mounted upon the shaft 32.

From the construction it is obvious that the prongs will engage from above upon the layer of tobacco leaves projecting from the passage opening and will strip the leaf portions from the stems and thereby remove the tobacco leaves from the tobacco stems. The stem portions and the stems are carried downwardly therewith and the stems will pass off through the bottom opening of the housing by their own weight.

The strip portions of the tobacco leaves which remain hanging on the prongs are stripped off by the pin roller 7 since the pins 8 of the pin roller 7 pass within the interstices of the comb prongs or tines 4. If any stem portions are engaged by the pins they will drop out through the bottom opening of the housing. The remaining strip portions of the leaves are thrown against the screen 9 and are there taken off by the air current of the pneumatic sorting apparatus.

The screen 16 serves to separate the dust from the lighter portions of the tobacco leaves.

I claim:

1. A tobacco classifying device comprising a housing, cutting means located within said housing, said housing having a discharge opening in the bottom thereof for the heavier portions of the tobacco, said housing having a second opening for the lighter leaf portions of the tobacco, a sorting device connected to said housing adjacent said second opening, screens covering said openings, a channel in said sorting device extending from said second opening in said housing, an adjustable wall forming a wall of said channel, a screen located in said sorting device and suction means conveying said lighter leaf portions from said cutting means through said sorting device.

2. A tobacco clasifying device comprising a housing, a feed chute located in said housing, a rotary support adjacent the outlet of said chute having prong bars thereon for stripping leaf portions from the stems of the tobacco leaves, a roller having pins thereon cooperating with said prong bars for removing the leaf portions therefrom, a discharge opening in said housing located below said prong bars through which the heavier portions of the tobacco will fall by gravity, a screened opening adjacent said pin roller through which the lighter leaf portions are carried by a current of air, a sorting device receiving said lighter leaf portions as they leave said screen, a plurality of discharge openings in said sorting device and a dust screen located in said sorting device.

3. A tobacco classifying device comprising a housing, rotary cutting means located within said housing, screens positioned below said cutting means, said housing having a discharge opening located at the bottom thereof for receiving the heavier portions of the tobacco, a fan located below said rotary cutting means, said housing having an opening located in a wall thereof for the lighter leaf portions of the tobacco, a passageway extending from said last named opening for the lighter leaf portions, means for enlarging or constricting said passageway, a discharge opening leading from said passageway for the heavier portions of the lighter leaf portions, a second discharge opening for the lighter leaf portions of the tobacco and a sluice controlling said last named discharge opening.

4. A tobacco classifying device comprising a housing, stem stripping means located within said housing, preliminary sorting means associated with said stripping means having an outlet for the heavier tobacco portions and an outlet for the lighter tobacco portions, an ascending classifying passage communicating with said outlet for said lighter tobacco portions having an outlet for any stems or heavier tobacco portions not sorted by said preliminary sorting means, a hopper with which said passage communicates, a dust screen located in said hopper, said hopper having an outlet for the lighter leaf portions, a sluice gate closing said hopper outlet and means for creating an air current through said housing.

OSWALD ERICH EISSMANN.